US006516481B1

(12) United States Patent
Erickson

(10) Patent No.: US 6,516,481 B1
(45) Date of Patent: Feb. 11, 2003

(54) MATTRESS FOR SUPPORT OF A PATIENT RECOVERING FROM SURGERY

(76) Inventor: Tomiko Erickson, 10100 E. Calusa Club Dr., Miami, FL (US) 33186

( * ) Notice: Subject to any disclaimer, the term of this patent is extended or adjusted under 35 U.S.C. 154(b) by 0 days.

(21) Appl. No.: 09/777,184

(22) Filed: Feb. 5, 2001

Related U.S. Application Data

(60) Provisional application No. 60/179,908, filed on Feb. 3, 2000.

(51) Int. Cl.[7] ................................ A61C 7/057

(52) U.S. Cl. ........................ 5/723; 5/727; 5/730; 5/724

(58) Field of Search ............................ 5/695, 722, 723, 5/724, 727, 730, 900.5

(56) References Cited

U.S. PATENT DOCUMENTS

| | | | | | |
|---|---|---|---|---|---|
| 433,261 | A | * | 7/1890 | Webb | 5/695 |
| 1,295,770 | A | * | 2/1919 | Lamont | 5/722 |
| 2,046,645 | A | * | 7/1936 | Mason | 5/695 |
| 2,615,175 | A | * | 10/1952 | Corakas | 4/456 |
| 3,146,469 | A | * | 9/1964 | Slade | 5/695 |
| 3,419,920 | A | * | 1/1969 | Maddux, Jr. et al. | 5/411 |
| 3,623,170 | A | * | 11/1971 | Staley et al. | 5/694 |
| 4,091,480 | A | * | 5/1978 | Oxenburg | 5/695 |
| 4,193,150 | A | * | 3/1980 | Vineberg | 297/DIG. 1 |
| 5,127,119 | A | * | 7/1992 | Rogers | 5/730 |

* cited by examiner

*Primary Examiner*—Michael F. Trettel

(57) ABSTRACT

A mattress assembly generally designed for use in hospitals and the like which is structured to effectively and comfortably support a patient during a period of recovery from a predetermined surgical procedure. The mattress assembly includes an elongated support platform having a corresponding dimension to that of a conventional hospital or like medical-type mattress and includes an opening formed therein and preferably extending therethrough. The opening is disposed in aligned, at least partially receiving relation to a predetermined portion of the patient's body directly involved in an invasive surgical procedure such as prostate surgery. More specifically, the opening is disposed, dimensioned and configured to receive and maintain portions of the patient's body, including external body parts, in an at least partially protected orientation and specifically out of supported engagement with a remainder of the support platform of the mattress. The opening may include a completely closed or at least partially open periphery, wherein the support platform may include an open area of access to facilitate positioning of medical equipment or instrumentation. The support platform preferably also includes an inclined portion disposed and configured to orient and support the head and upper torso portion of the patient's body in a partially inclined position.

11 Claims, 6 Drawing Sheets

MATTRESS FOR SUPPORT OF A PATIENT RECOVERING FROM SURGERY

CLAIM OF PRIORITY

This application claims priority to the U.S. provisional patent application having Ser. No. 60/179,908 filed on Feb. 3, 2000, which is incorporated herein by reference.

BACKGROUND OF THE INVENTION

1. Field of the Invention

This invention relates to a mattress structured to effectively and comfortably support a patient during a period of recovery from surgery or other invasive procedures, wherein the mattress comprises a support platform having an opening formed therein and disposed, dimensioned, and configured to at least partially receive and protect a predetermined portion of a patient's body, which is directly related to the surgical procedure, such as prostate surgery, from which the patient is recovering. The predetermined body portion, and particularly any external body parts associated therewith, are maintained out of forced engagement or supported contact with adjacent portions of the support platform or other objects.

2. Description of the Related Art

Virtually all health care facilities including hospitals, clinics, out-patient emergency rooms, etc. utilize substantially conventional mattresses intended for use with a hospital bed, gurney, stretcher, etc. These medical-type mattress are typically designed to include an elongated support platform of generally standard length and width, dependent upon whether the support platform is to be mounted on a hospital bed or gurney, stretcher, etc. More specifically, conventional hospital mattresses, particularly of the type designed to be mounted on an electrically powered, mechanically adjustable hospital bed have a length of substantially 80 inches and a somewhat standard width or transverse dimension of substantially 36 inches. The support platform normally includes two primary outer walls, each of which may include a supporting surface. One of the supporting surfaces is disposed in supporting relation to the frame of the hospital bed and the other is disposed in supporting relation to the patient. In addition, the interior structures of such mattresses typically include a number of coils or springs alone or in combination with a compressible, foam or other cushion like material, in order to provide a predetermined amount of support to the patient's body while at the same time allowing the mattress to be selectively disposed between a complete horizontal or flat orientation and a partially inclined orientation. The latter orientation of the support platform is typically defined by the head or proximal end of the mattress being oriented at any one of a plurality of inclined angles, which serves to orient the head, shoulders, and generally upper torso region of the patient's body in an upwardly, partially inclined position. This inclined orientation of the upper portion of the patient's body is frequently accomplished to make the patient more comfortable or to allow the patient to better view his or her surroundings and to communicate with medical personnel, visitors, etc. There are, however, a few situations wherein the patient is instructed to maintain as much as possible, the upwardly, inclined orientation described above, in order to help alleviate swelling, assist with drainage of a wound, etc.

As mentioned above, the mattresses used in hospitals or like health care facilities usually comprise a standard structure which is intended to provide adequate support to the patient while resting or sleeping in a fully reclined position or in an at least partially inclined position, as set forth above. However, it is believed that medical institutions have never provided a mattress or like support platform, which is structurally adapted to more readily accommodate certain medical conditions for which the patient is being treated.

More specifically, patients which have been involved in surgery or other invasive procedures frequently must remain in the hospital or like medical facility during a somewhat prolonged period of recovery. During such a recovery period the patient often experiences considerable pain or discomfort, directly associated with the surgical procedure. Such discomfort is experienced until the healing of the patient's body progresses at least to a sufficient degree to where pain is no longer an acute problem. In typical fashion, a patient recovering from surgery is placed on a conventional hospital mattress and oriented in either a fully reclined or partially reclined position, as set forth above. However, it is well known by medical personnel that forced engagement with the supporting surface of the mattress or direct contact of certain portions of the patient's body, which are directly associated with the attendant surgical procedure, frequently results in considerable pain. Because of the generally standardized design of medical type mattresses, as set forth above, the patient is forced to be oriented into a position which almost certainly results in added and oftentimes unnecessary discomfort. This is particularly true when the portion of the patient's body directly related to the surgery comes in direct supported engagement with an adjacently disposed portion of the support platform of the medical mattress on which the patient is disposed.

As set forth above, a large number of hospital beds are electrically powered and capable of being selectively adjusted, such that the head or proximal end thereof may be oriented at an upwardly inclined angle. The adjustment of a hospital bed in the manner set forth above, is normally done to make the patient more comfortable. However, the movement of the support platform of the mattress into and out of the partially inclined position can cause forced engagement or contact of the support platform with the portion of the patient's body associated with the surgery, thereby adding to the extreme discomfort of the patient, as set forth above. Movement or adjustment of the hospital bed may be particularly problematic when, during a recuperative period of the patient, he or she is required to be periodically or continuously oriented in the aforementioned upwardly inclined position.

At least one particular medical condition following a surgical procedure frequently requires a recovery period prone to the problems of the type set forth above. In particular, it is commonly recognized by the medical profession that prostate cancer in middle age to elderly male patients occurs with such frequency to affect a significant portion of the male population. While treatment of prostate cancer frequently includes the use of chemotherapy or radiation, prostate surgery, including the removal of the prostate gland, is oftentimes a preferred method of treatment. It is equally well accepted in the medical profession that patients having undergone prostate surgery must be subjected to a recovery period involving extensive bed rest. Because of the nature of the surgical procedure involved in the removal of the prostate gland, the associated area of the patient's body, generally the groin area, is subjected to extreme pain when disposed into supported engagement with any object, such as and including a hospital mattress on which the patient is supported. The patient's discomfort is often increased by the fact that the patient is usually instructed to maintain himself in an at least partially inclined orientation, with the head, shoulders, back and generally upper torso region of the patient's body being supported in the aforementioned angularly inclined orientation. More in particular, the utilization of a conventional hospital mattress mounted on an electrically powered, mechanically adjustable hospital bed necessitates the physical, mechanical movement of the head portion of the mattress into the angularly inclined position, with that movement causing some compression of the mattress at a mid-region thereof. It is almost precisely at that general location on the mattress, however, that the wounded area of a patient recovering from prostate surgery rests, such that the movement of the mattress and/or the orientation or adjustment of the patient's body thereon, will invariably subject the patient to extreme pain, and most especially during the time period immediately following prostate surgery.

Accordingly, there is a significant need in the medical field for an improved mattress assembly, and in particular, one which is specifically designed, dimensioned and configured to effectively and comfortably support a patient during the period of recovery following certain surgeries or other medical procedures. If any such improved mattress assembly were developed, it should enable predetermined portions or areas of a patient's body to be maintained in a generally protected position, while adequately and securely supporting a remainder or majority of the patient's body in a comfortable manner. If any such improved medical-type mattress assembly were developed, it should also have an overall dimension and configuration which substantially corresponds to a conventional hospital or medical type mattress so that it can thereby be used with conventional hospital beds, gurneys, stretchers, etc. The structural features of any such improved mattress assembly would preferably also be such as to eliminate the need for movable adjustment of the mattress, with the patient supported thereon.

In addition, the structural design of any such improved mattress assembly should be capable of being easily modified or adapted for supporting a patient in a conventional manner, such as for a patient who has not undergone prostate surgery or another invasive medical procedures. Therefore, the structure and design of such an improved medical-type mattress should be capable of being converted in an easy and efficient manner and in a minimum amount of time by attending medical personnel in order that the patient may be properly supported in a preferred orientation to facilitate his recovery without experiencing undo pain or discomfort, particularly in an area or portion of the patient's body associated with a specific surgical procedure.

SUMMARY OF THE INVENTION

The present invention is designed to address these and other needs which exist in the art and relates to a mattress assembly for use with a conventional hospital bed. The mattress assembly of the present invention is structured to effectively and comfortably support a patient during a period of recovery from surgery, and specifically, but not exclusively, wherein the patient has recently undergone prostate surgery. During the recovery period immediately following a variety of different surgical procedures, including prostate surgery in particular, the patient is subjected to bed rest and is instructed to maintain and may even be required to maintain a partially inclined position, dependent upon the specific surgical procedure involved. During recovery, the portion or area of the patient's body most directly associated with the surgical procedure is normally subjected to varying amounts of pain or discomfort. In prostate surgery, wherein the prostate gland is completely or partially removed, the groin area of the patient's body is particularly sensitive and the source of considerable pain, particularly in situations where external body parts, including the genitals of the patient are forced into contact or supported engagement with an adjacent object, such as the mattress on which the patient is supported. The pain to which the associated parts of the patient's body is subjected, particularly when the supporting hospital mattress is adjusted so as to orient the patient in the preferred upwardly inclined angular position, is extreme. When the patient is so inclined, the general area of the groin is disposed adjacent to the transitional part of the mattress, where the angularly inclined head portion joins with the horizontally oriented remainder of the mattress. As set forth above, forced movement of the mattress into contact with predetermined portions of the patient's body, such as the general groin area, subjects the patient to severe and unnecessary pain.

In an effort to overcome the significant discomfort to which the patient is subjected during the recuperative period immediately following prostate surgery, the present invention is directed to a mattress assembly including a support platform of generally conventional or standard longitudinal and transverse dimensions, and as such, the support platform will preferably be readily used with a conventional hospital bed and/or bed frame. However, the support platform is structured to permit the patient to assume a preferred orientation so as to facilitate recovery, and yet, eliminate or significantly reduce the pain or discomfort experienced by the patient while he is subjected to an extended period of bed rest. More specifically, the aforementioned support platform may be formed of a compressible foam or other applicable material capable of providing adequate support to a majority of the patient's body.

The mattress assembly of the present invention preferably also comprises a mattress cover or casing disposed in at least substantially, surrounding and enclosing relation to the exterior surface of the support platform. The mattress cover or casing is structured to protect the support platform against contamination or soiling from bodily fluids, spillage, etc. and may itself be removable and possibly, washable as well. The protective mattress casing is preferably formed from a high strength, durable, liquid impermeable material of the type normally found in use in medical facilities. In addition, the material from which the mattress casing or cover assembly is formed may also have additional physical properties, such as being electrically conductive, flame retardant, antibacterial, non-allergenic, etc. By way of example, materials from which the casing may be formed are commercially available under the trade names to STAPH-CHECK™ or ELECTROLITE™, both of which are produced by Herculite Product, Inc. of York Pa. of course, other materials having certain medically desired performance or operational properties may be utilized.

In order to overcome the above set forth disadvantages and provide secure and comfortable support of a patient, particularly during the period of recovery from at least certain types of surgical procedures, the support platform of the mattress assembly includes an opening formed at least partially therein, although in certain preferred embodiments to be described in greater detail hereinafter, the opening extends completely therethrough. The opening is disposed in aligned and at least partially receiving relation to a predetermined portion or area of the patient's body, such as that portion which was directly involved in a surgical procedure from which the patient is recuperating. As one example, prostate surgery involves a procedure in or about the general groin area, including the genitals and/or the surrounding or associated body parts in the vicinity of the groin. As set forth above, following that type of surgery, almost any engagement or contact whatsoever with this area of the patient's body results in extreme pain. Accordingly, the support platform of the present invention preferably includes the aforementioned opening being disposed in at least partially aligned relation to the general groin area of the patient's body, so as to receive the external body parts, and in particular, so as to maintain at least the patient's genital area out of forced engagement or supported contact with a remainder of the support platform.

In at least one embodiment of the present invention, the support platform includes an open area of access which establishes communication between an interior of the opening and an exterior of the support platform. This open area of access may take the form of an elongated, slot-like configured passage or alternatively, may comprise a somewhat enlarged access channel, disposed to extend between a periphery of the opening and a longitudinal side of the support platform. In either of the above noted embodiments, the open area of access is sufficiently dimensioned for the passage therethrough of certain medical equipment or instrumentation that may be required or otherwise deemed important to the recuperation of the patient, such as, but not limited to, catheters, drainage tubes, etc.

In one embodiment of the present invention, the mattress assembly may also include a supportive insert positioned at least partially within the aforementioned access channel. The supportive insert is structured and disposed to provide adequate support to portions of the patient's body other than the predetermined body portions directly associated with the surgical procedure. As such, the supportive insert is preferably formed from a foam or other compressible material similar or equivalent to the material from which the mattress is formed. The supportive insert also preferably includes a protective outer casing or cover assembly made from the durable, liquid impermeable material from which the protective casing for the remainder of the mattress is formed. In addition, the supportive insert is structured to be selectively positioned into and out of either a supportive position or a non-supportive position. More specifically, the supportive position of the insert is defined by it being disposed in substantially closing relation to the access channel and in supporting relation to the patient. The non-supportive position of the insert is defined by the insert being removed from the access channel so as to effectively open the access channel in order to allow passage of any medical instrumentation or equipment therethrough into and out of the interior of the opening and in applied engagement with the patient's body. As also set forth hereinafter in greater detail, the supportive insert may be removably mounted on the support platform or alternatively may be pivotally or otherwise movably connected thereto.

The support platform of the mattress assembly according to the present invention will preferably also include an inclined portion provided for the support of the patient in an upwardly inclined position. The inclined portion extends from a proximal end of the support platform, preferably corresponding to the patient's head and chest area, continuously to a portion along the length of the support platform which is located a spaced distance from the correspondingly positioned periphery of the opening. More specifically, the inclined portion preferably joins the remainder of the support assembly at a spaced distance from the periphery of the opening, so as to provide support for the buttocks or lower back area of the patient. Concurrently, the patient's head, shoulders, and a major portion of the upper torso is supported in an angular inclined orientation on the remainder of the inclined portion of the support platform.

It is pointed out that the precise dimensions of each of the preferred segments or portions of the support platform according to the present invention may vary to at least some degree. However, in a most preferred embodiment, corresponding to the generally standard length of 80 inches for most hospital mattresses, the inclined portion of the support platform extends continuously along a length of the support platform from the proximal end towards, but in spaced relation to the opening, for a distance of generally about 37 inches or approximately 46 percent of the length of the support platform. The support platform thereafter continues at a substantially horizontal or level orientation from end of the inclined portion and to the opening for a distance of approximately 7 inches or between 8 and 9 percent of the length of the support platform, and similarly, the support platform continues in such substantially level orientation for generally about 12 inches corresponding the opening therein. The opposite or distal end of the support platform is also supported in a substantially horizontal orientation and extends continuously from the distal end to a correspondingly disposed periphery of the opening, a distance of approximately 24 inches to 25 inches or substantially 30 percent of the length of the support platform. In at least one most preferred embodiment of the present invention, the opening in the support platform has a multi-sided configuration and measures approximately 12 inches by 12 inches. Further, the opening is disposed in equally spaced relation between the opposite longitudinal sides of the support platform. Since the support platform has a standard transverse dimension of substantially 36 inches, the opening is centered between the longitudinal sides, but in somewhat closer proximity to the distal end of the support platform.

It is emphasized that while the aforementioned inclined potion may be incorporated in at least one embodiment of the support platform of the present invention, at least one additional embodiment comprises the support platform having a substantially flat configuration extending along its entire length. The opening formed in this embodiment of the support platform has either a continuously closed configuration or an at least partially open configuration defining the aforementioned open access area for the placement and removal of medical equipment or instrumentation associated with the patient's care. In this latter embodiment the disposition, configuration and dimension of the opening relative to the remaining part of the support platform is substantially the same. However, minor structural modifications to the opening or to other portions of the support platform may be made in order to accommodate the support of a patient recuperating from a surgical or invasive procedure, other than prostate surgery. Such structural modifications are intended to be included within the spirit and scope of the present invention.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
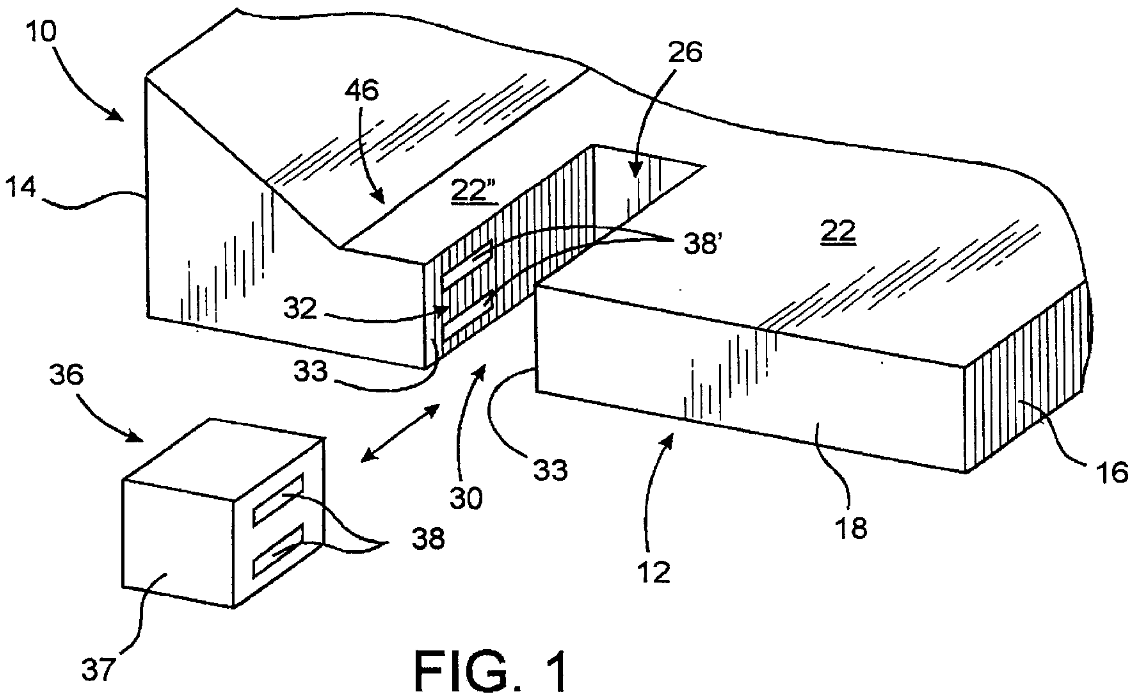
FIG. 1 is a perspective and partially exploded view of one embodiment of the support platform associated with the mattress assembly of the present invention.

As shown in the accompanying drawings, the present invention is directed towards a mattress assembly, as is generally indicated by reference numeral 10, structured to effectively and comfortably support a patient during his or her recovery from surgery. As will be explained in greater detail hereinafter, the mattress assembly 10 of the present invention is structured to be particularly well-suited for adequately supporting a patient who has undergone prostate surgery, wherein the affected area of the patient's body is protected from significant additional pain that would otherwise be caused by the forced engagement or contact of that area with a standard type of hospital mattress. Accordingly, the comfort of the patient being supported on the mattress assembly 10 of the present invention is significantly enhanced during the period of recuperation, regardless of whether the patient is oriented in a fully reclined or at least partially inclined orientation.

Figure 2:
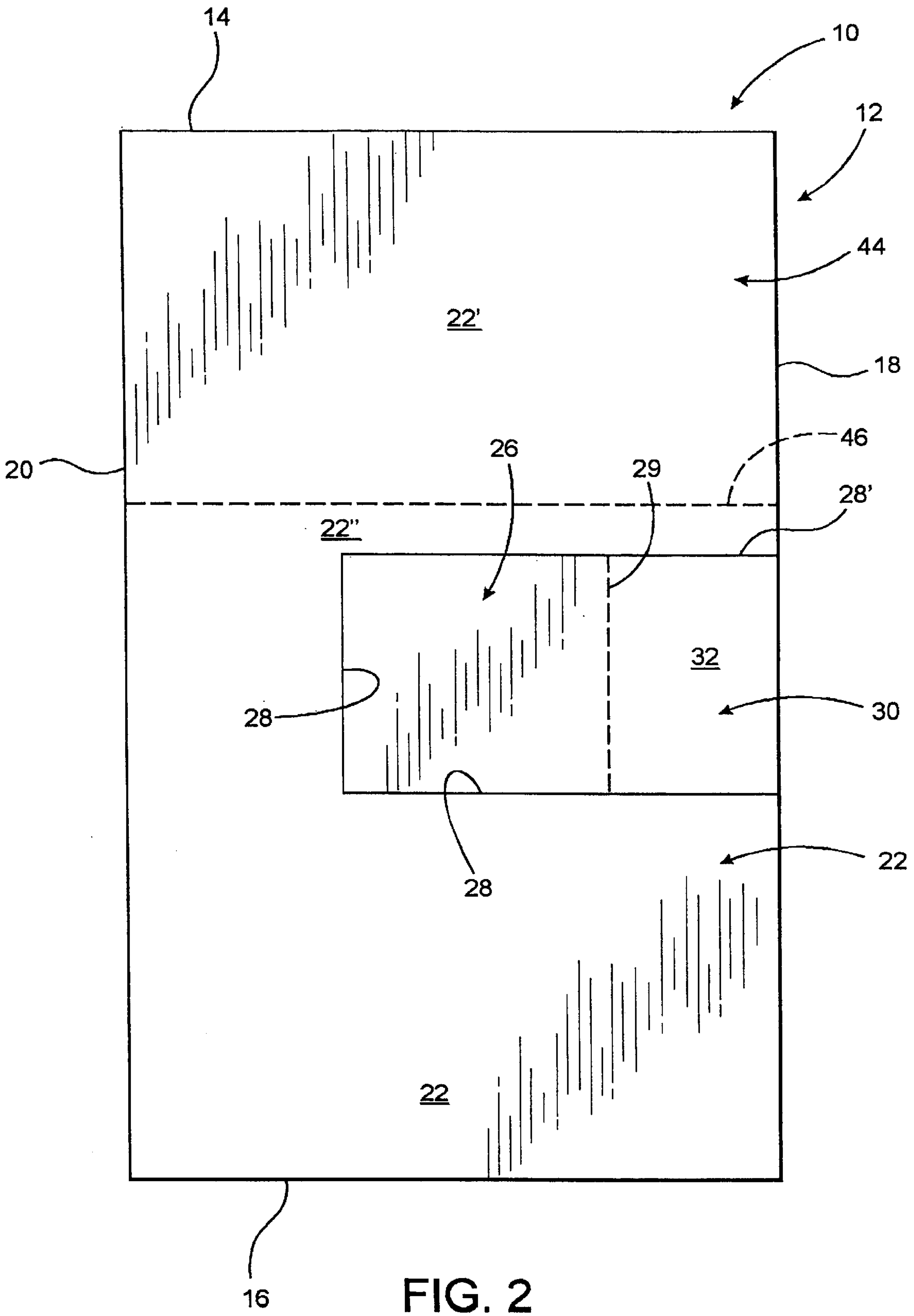
FIG. 2 is a top view of an embodiment such as that shown in FIG. 1 although illustrating the access opening formed in an opposite longitudinal side thereof.
Figure 3:
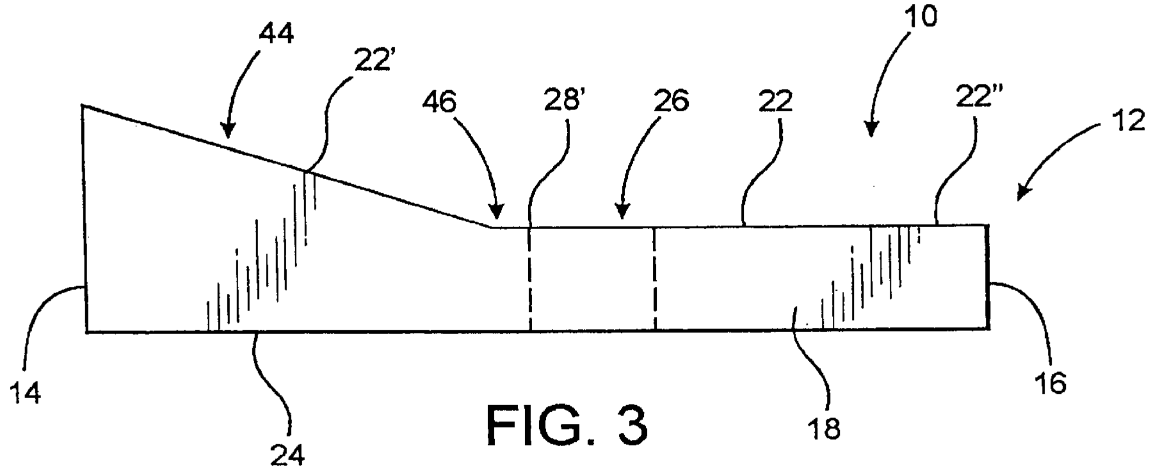
FIG. 3 is a side view of the embodiment of FIGS. 1 and 2.

More specifically, the mattress assembly 10 of the present invention comprises a support platform, which is generally indicated as 12 in the embodiment shown in FIGS. 1 through 3. The support platform 12 may be formed from a foam or other conventional compressible material. Alternatively, the support platform 12 may have a plurality of springs or coils making up its internal construction, wherein these or other structural variations are designed to adequately support a patient in an at least partially reclined position. The support platform 12 includes a proximal end 14 and a distal end 16 and an elongated configuration, at least partially defined by oppositely disposed longitudinal sides 18 and 20. In addition, the support platform 12 includes two primary outer walls 22 and 24 respectively defining an outer supporting surface and an underlying supporting surface. The underlying supporting surface or wall 24 is adapted to engage a support frame of a conventional hospital bed. The outer surface or wall 22 defines the surface on which a patient is supported. In addition, the support platform 12 is structured to include a somewhat standard overall dimension, in that the length of the support platform 12 is substantially 80 inches and the width or transverse dimension thereof is substantially 36 inches. It is emphasized that the overall dimensions of the mattress assembly 10 can of course vary from the standard dimensions of a medical-type mattress, as set forth above, without departing from the intended spirit and scope of the present invention.

The support platform 12 of the present invention includes an opening, generally indicated as 26, formed therein which preferably, but not necessarily, extends completely therethrough. In the various embodiments of the present invention, the opening 26 or 26' is disposed in communicating relation with both the outer walls and/or surfaces 22 and 24. Further, while the periphery 28 of the opening 26 may take a variety of configurations, it is preferably formed into a somewhat equilateral configuration, such as a square configuration, having equal longitudinal and transverse dimensions. The opening 26 is preferably formed within the support platform 12 so as to be disposed in substantially aligned and at least partially receiving relation to that body portion of the patient most closely associated with the area of the body on which the surgery, or other invasive procedure was preformed. As mentioned above, the present invention is particularly well suited for adequately supporting a patient who has undergone prostate surgery, and accordingly, the opening 26 is ideally disposed so as to be substantially aligned with the general groin area of the patient's body. Also, the overall dimension and configuration of the opening 26 is such as to allow external body parts, such as the genitals of the patient, to extend into the interior of the opening 26. In this manner, the predetermined body portion most closely associated with the surgical procedure, in this case prostate surgery, is maintained in a substantially protected position. This protected position may be defined by the disposition of the external body parts being maintained out of supported engagement or forced contact with any object, including a remainder of the support platform 12, which surrounds the predetermined portion or area of the patient's body, associated with the surgical procedure. Therefore, the severe pain and/or discomfort which the patient is normally forced to endure, while being oriented in a reclined or partially inclined position, is significantly reduced or eliminated due to the fact that the predetermined body portion of the patient's body, most closely associated with the corresponding surgical procedure, is protected from any type of unnecessary contact or engagement with the mattress assembly 10 or any other object.

In addition, during patient care immediately following surgery it is common practice to apply catheters, drainage tubes or other medical equipment or instrumentation to the patient particularly at the area of the patient's body where the surgical procedure was performed. In order to more comfortably accomplish the application and maintenance of such medical devices to or on the patient, the support platform 12 preferably also includes the opening 26 being disposed in direct communication with an open area of access, generally indicated as 30. The open area of access 30 may take the form of a substantially enlarged access channel 32, as shown in FIGS. 1, 4, 6 or 10. Alternatively, the open area of access 30 may be defined by an access passage 32' disclosed in the embodiment of FIG. 7 and discussed in greater detailed hereinafter. The access channel 32 has a sufficiently enlarged transverse dimension to facilitate the passage therethrough of various catheters, drainage tubes, etc., in order to facilitate the attachment of such devices directly to the patient, as set forth above. Accordingly, the access channel 32 is disposed in interconnecting, communicating relation between at least one of the sides of the support platform, and preferably, but not necessarily limited to a correspondingly disposed longitudinal side 18 of the support platform 12 and the interior of the opening 26. In one of the embodiments shown, the transverse dimension of the access channel 32 is substantially equivalent to an open side 29 represented in phantom lines in FIG. 2, such that the periphery 28 of the opening 26 is defined by an at least partially open configuration.

Figure 4:
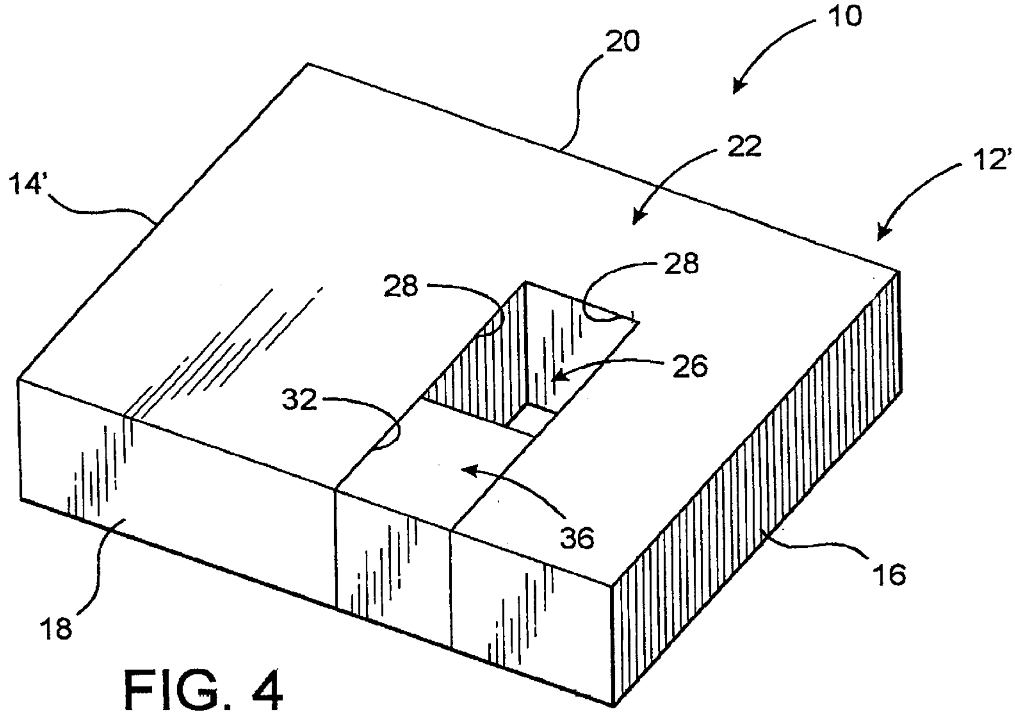
FIG. 4 is a perspective view of another embodiment of a support platform associated with the mattress assembly of the present invention.

It is, of course, important that the patient be adequately supported over substantially all portions of his body other than the predetermined portion or area directly associated with the surgical procedure, as set forth above. Therefore, and with reference to FIGS. 1, 4, 6 and 10, the mattress assembly 10 of the present invention includes in at least one embodiment, the provision of a supportive insert, generally indicated as 36, which is selectively positionable into either a supportive position or a non-supportive position. With specific reference to FIGS. 1, 6 and 10, the supportive insert 36 is dimensioned and configured to extend into the open area of access 30, in substantially closing or covering relation to the access channel 32. In such a "closed" position, the insert is oriented so as to help support correspondingly positioned parts of the patient's body, rather than have those parts or areas of the patient's body passing through or into the open area of access 30 or access channel 32. In addition, in order to maintain the supportive insert 36 in the aforementioned supportive position as shown in FIGS. 3 and 4, an attachment assembly is mounted on the exterior surfaces thereof, as at 37, and preferably on opposite sides of the supportive insert 36 as well as on the interior surfaces 33 of the access channel 32. The attachment assembly 37 may take the form of one or more attachment members 38 and 38', such as but not limited to hook and loop type fasteners, disposed and structured to be detachably secured to one another so as to facilitate the maintenance of the insert 36 in its closed position, as also shown in FIG. 4. The removable connection of the attachment members 38 and 38' significantly reduces the possibility of the inadvertent displacement or detachment of the insert 36 from the support platform 12 or 12', particularly when a portion of the patient's body is resting thereon or being supported thereby. In the non-supportive position, as shown in the different embodiments of FIGS. 1 and 6, the supportive insert 36 is disposed out of or away from the open area of access 30 so as to leave the access channel 32 open. Catheters, drainage tubes or like medical equipment may thereby be easily passed through the open area of access 30 and disposed on the interior of the opening 26 to facilitate their connection to the predetermined portion of the patient's body or more comfortable maintenance within the opening 26 after their attachment to the patient's body.

Figure 6:
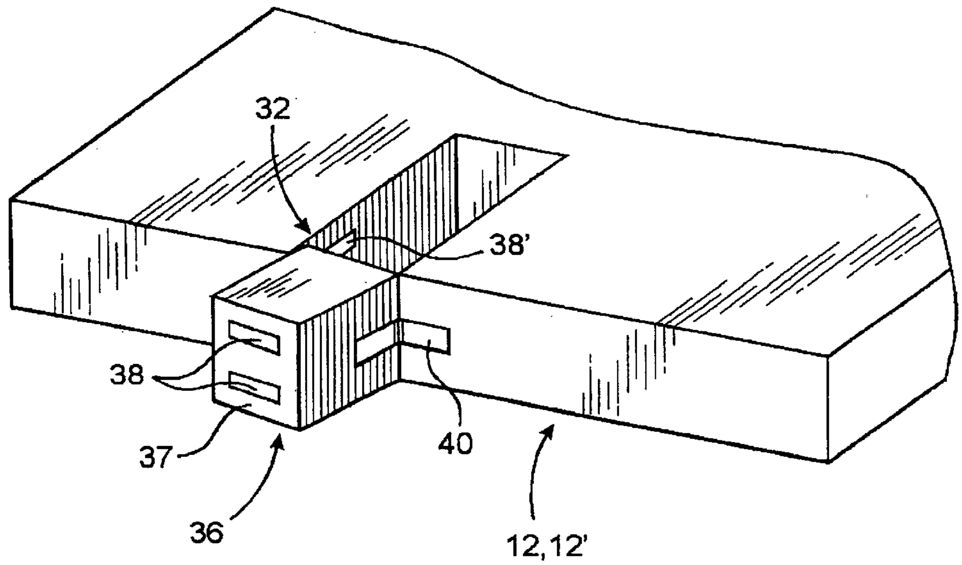
FIG. 6 is yet another embodiment of the support platform different from that of the embodiment of FIG. 1.

With reference to FIG. 1, the supportive insert 36 can in one embodiment be completely detachable from the support platform 12. It is contemplated that this embodiment will permit the protective outer casing or cover assembly for the supportive insert to be cleaned or possibly even removed for a more thorough washing, as may be necessary should a patient's bodily fluids leak or otherwise be spilled thereon. In an alternative embodiment, the supportive insert 36 can be movably secured or connected to the support platform 12 or 12', as shown in FIG. 6, by means of a connector 40. The connector 40 serves to pivotally or otherwise movably connect the supportive insert 36 to an appropriate or convenient location on or adjacent to the support platform 12 or 12'. In either embodiment, the supportive insert 36 is easily disposed between the aforementioned supportive position and the non-supportive position respectively defining a closed or open orientation relative to the access channel 32.

It should be further noted that the connecting member 40 may have a variety of different structures and be formed of a flexible, partially flexible or semi-rigid material so as to facilitate the movable attachment of the supportive insert 36 to the support platform 12 or 12' in a manner which not only aids in the selective positioning thereof, but also helps support and maintain the insert 36 in its supportive, closed position. The connecting member 40 will also facilitate the maintenance of supportive insert 36 in its supportive position when a part of the patient's body is resting thereon.

With reference now to FIGS. 1 and 3, the mattress assembly 10 of the present invention also includes in the more preferred embodiments an inclined portion, generally indicated as 44. The inclined portion 44 includes an outer exposed supporting surface 22' extending continuously along the outer wall 22 from substantially the proximal end 14 of the support platform 12 to a predetermined location 46. The location 46 at least partially defines an area of transition between the angularly oriented surface 22' and the level surface portion of the outer wall 22. The location 46 is preferably disposed in spaced relation from the opening 26, and more specifically, from the correspondingly disposed periphery 28' of the opening 26. The inclined portion 44 is disposed to orient and support the head, shoulders, upper back and/or generally the upper torso of the patient in an at least partially inclined orientation so as to assist with circulation, drainage, etc., as defined by the angular orientation of the surface 22' relative to the substantially horizontal or level surface 22" of the support platform 12. In addition, the length of the surface 22" between the predetermined portion 46 of the support platform 12 and the corresponding periphery 28' is sufficient to at least partially support the buttocks or other area of the patient's body. The comfortable orientation of the patient in an at least partially inclined position is there by facilitated, while maintaining the general groin area directly associated with the prostate surgery in a protective orientation within the interior of the opening 26. The precise angular orientation of the support surface 22' may be in the range of about thirty to forty-five degrees, although this can vary, of course, as the particular desired upwardly inclined position in which the patient is to be disposed following surgery may be greater or lesser, dependent upon the surgical procedure from which the patient is recovering.

While the various components of the support platform 12 may vary in size and configuration and still be encompassed within the intended spirit and scope of the present invention, a preferred configuration and dimension of the support platform 12, as shown in the embodiment of FIGS. 1 through 3 includes the inclined portion 44 extending generally about 37 inches along the length of the support platform 12 from the proximal end 14 to the location 46. With reference to FIG. 1, the length of the surface portion 22" from the predetermined portion 46 to the correspondingly disposed periphery 28' of the opening 26 is generally in the range of about 7 inches. The longitudinal dimension of the opening 26 is preferably about 12 inches, and further, the distance from the distal end 16 of the support platform 12 to the opening 26, and more specifically to the correspondingly disposed periphery 28 thereof, is generally about 24 inches. In addition to the above, the equilateral, multi-sided configuration of the opening 26 is preferably such that it is substantially centered between the longitudinal sides 18 and 20, as shown.

Another embodiment of the present invention is shown in FIG. 4, wherein the support platform 12' has a substantially equivalent structure to that of the support platform 12 in the embodiment of FIGS. 1 through 3 with the exception that the support platform 12' is substantially level or flat across the entire exposed surface of the outer wall 22. In this embodiment the inclined portion 44 is deleted and the patient is normally oriented on the support platform 12' in a fully reclined position, although pillows and the like could be utilized to cause the patient to assume an more inclined orientation thereon. Also with reference to FIG. 4, the supportive insert 36 is shown in the supportive position and in closed relation to the access channel 32. As set forth above, the insert 36 may either be removably secured to the support platform 12' or movably and adjustably secured thereto as respectively represented in FIGS. 1 and 6, discussed above.

Figure 5:
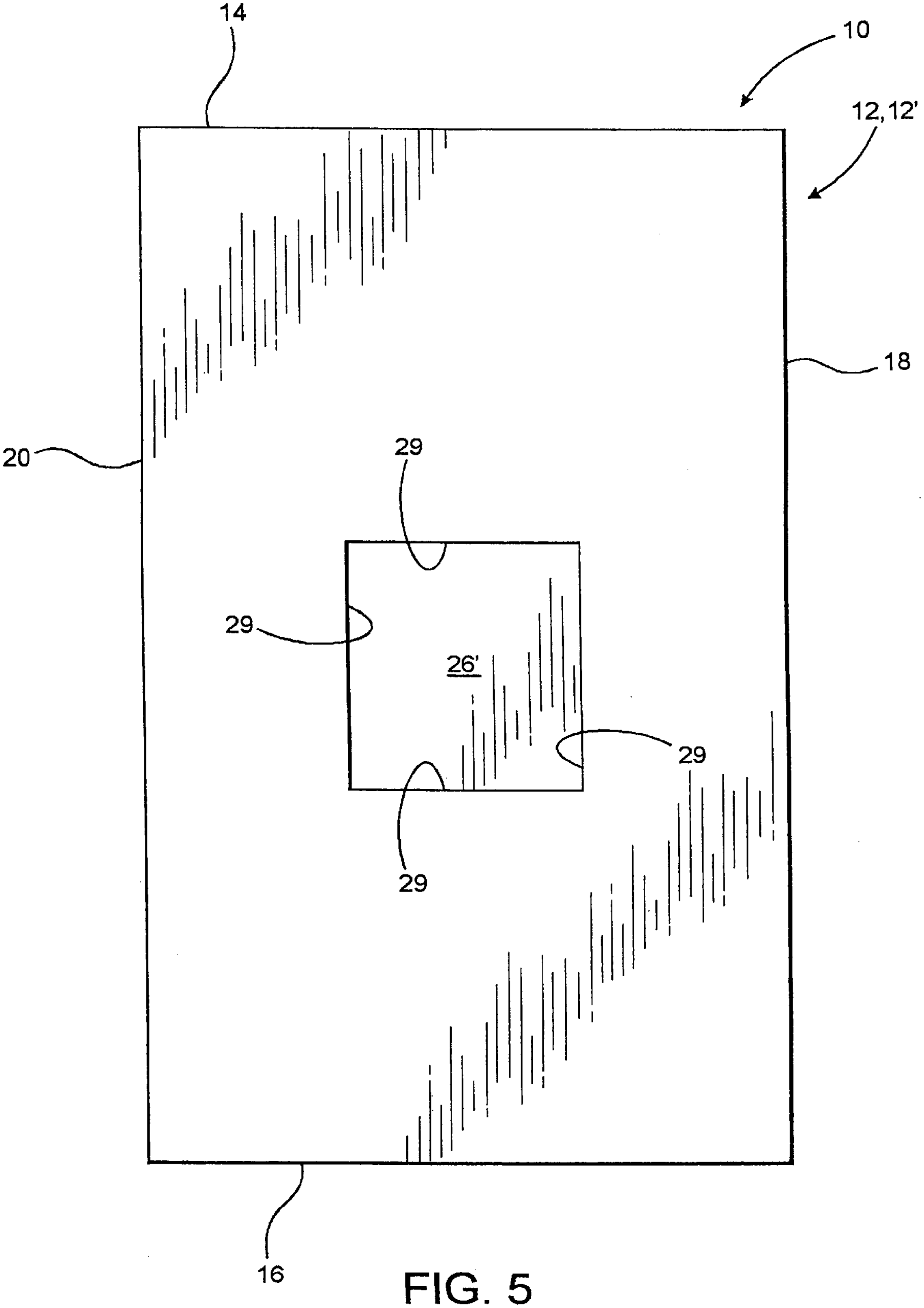
FIG. 5 is another embodiment of the support platform different from that of the embodiment of FIG. 1.

Yet another embodiment of the present invention is shown in FIG. 5, wherein the support platform may be represented by the various embodiments 12 or 12'. In this embodiment, the support platform 12 or 12' includes an opening 26' having a completely closed configuration 29, thereby eliminating the open area of access 30 defined by either the enlarged access channel 32 or the reduced size access passage 32'. In the embodiment of FIG. 5 it may be possible to attach the patient to the required medical instrumentation or equipment by initially passing such equipment through the bottom of the enclosed opening 26' and/or joining such equipment together after passage of one set through the opening 26'.

Figure 7:
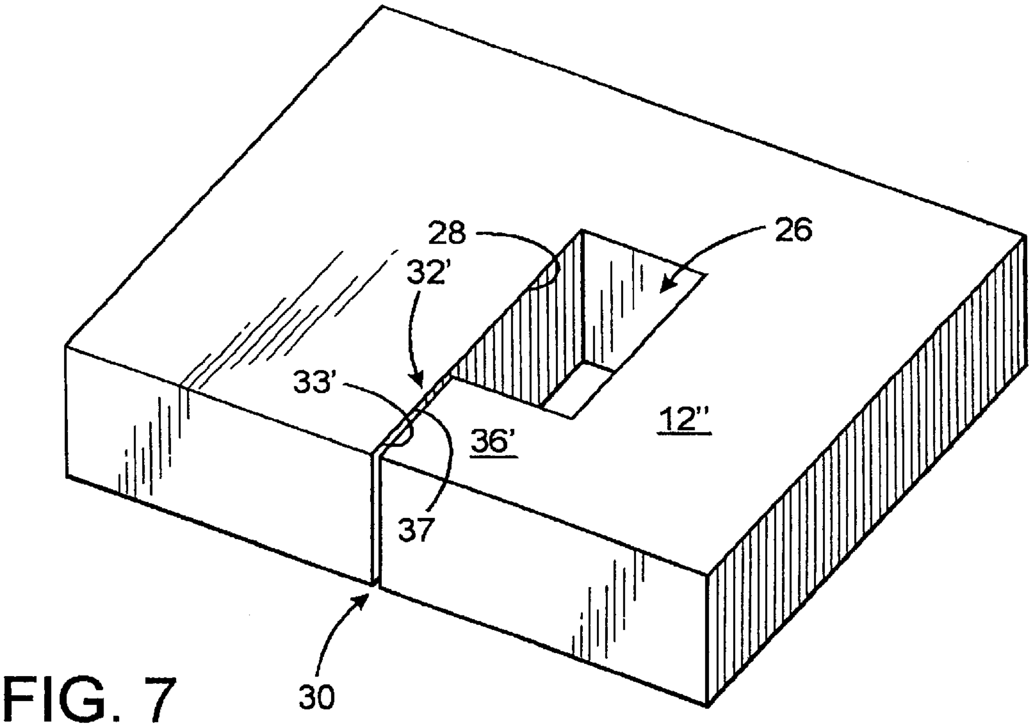
FIG. 7 is yet another embodiment of the support platform of the present invention.

With reference now to FIG. 7, another embodiment of the mattress assembly 10 is illustrated. In this embodiment, the support platform 12" includes an open area of access 30 having an elongated passage 32' with a greatly reduced transverse dimension, as compared to the enlarged access channel 32 of the embodiments illustrated in FIGS. 1, 2, 4 and 6. In this embodiment, the support platform 12" includes what may be referred to as an integrally formed supportive insert 36'. More specifically, the insert 36' may comprise an integral or fixed portion of the support platform 12" disposed and dimensioned to extend substantially if not almost completely across the open area of access 30. The exposed surface of the end 37 of the fixed insert 36' is disposed in direct confronting and/or minimally spaced relation to the correspondingly dispose surface as at 33'. However, the compressible nature of the material from which the support platform 12' is conventionally formed allows a certain distortion and/or compression of the fixed insert 36', thereby serving to enlarge the transverse dimension of the access passage 32'. Such enlarged opening of the access passage 32' should be sufficient to allow the passage therethrough of appropriate drainage and/or catheter equipment, as set forth above.

Figure 8:
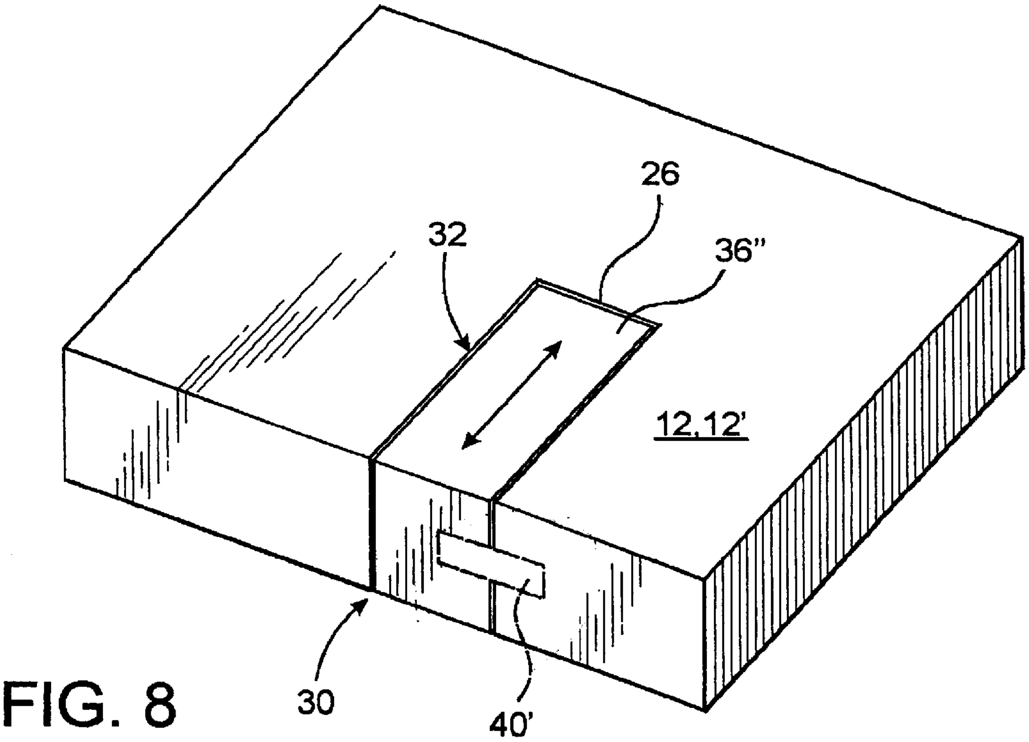
FIG. 8 is still another embodiment of the support platform of the mattress assembly of the present invention.
Figure 10:
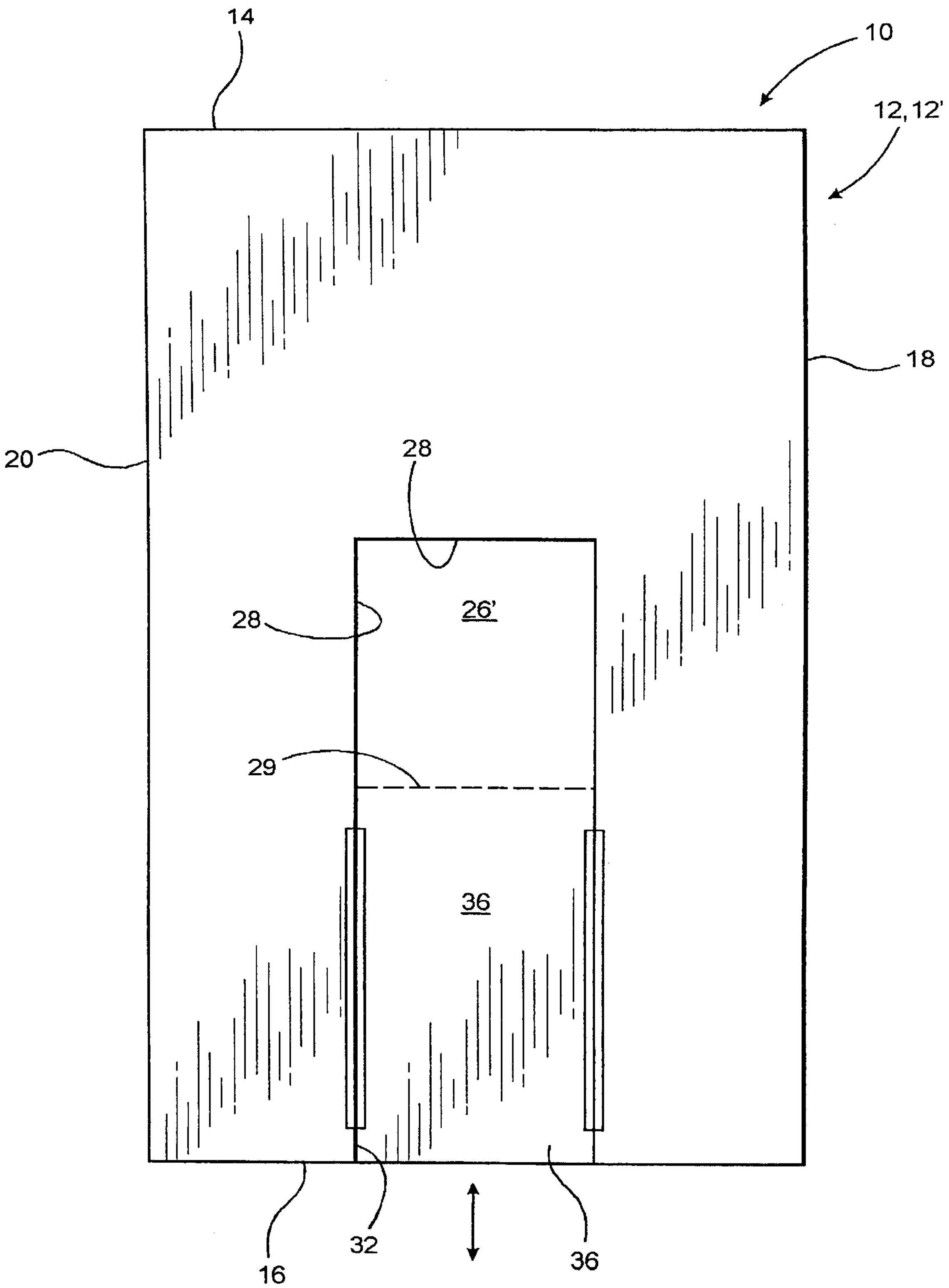
FIG. 10 is yet another embodiment of a support platform of the mattress assembly of the present invention.

Yet another embodiment of the present invention is shown in FIG. 8, wherein the support platform 12 or 12' includes the opening 26 extending therethrough and an open area of access 30 defined by the substantially enlarged access channel 32. In this embodiment, the supportive insert 36" has a somewhat enlarged dimension and configuration so as to substantially fill both the open area of access 30 defined by the access channel 32 as well as the opening 26 itself. The enlarged insert 36" is used primarily wherein the support platform 12 or 12' of the mattress assembly 10 is used to support a patient who may be hospitalized for other reasons, meaning not necessarily for surgery or recovery from surgery, but who nevertheless should receive from the mattress assembly 10 a firm, effective support of substantially all portions of the body. In such a situation, the opening 26 is not needed to maintain predetermined portions of the patient's body in a protected orientation nor out of forced engagement or contact with the support platform 12 or 12'. Further, the enlarged supportive insert 36" may be removably inserted or movably or otherwise connected, as indicated by the connecting member 40' represented in phantom lines, and may also be secured within the open area of access 30 and opening 26 by the appropriately positioned attachment members 38 and/or 38'.

Figure 9:
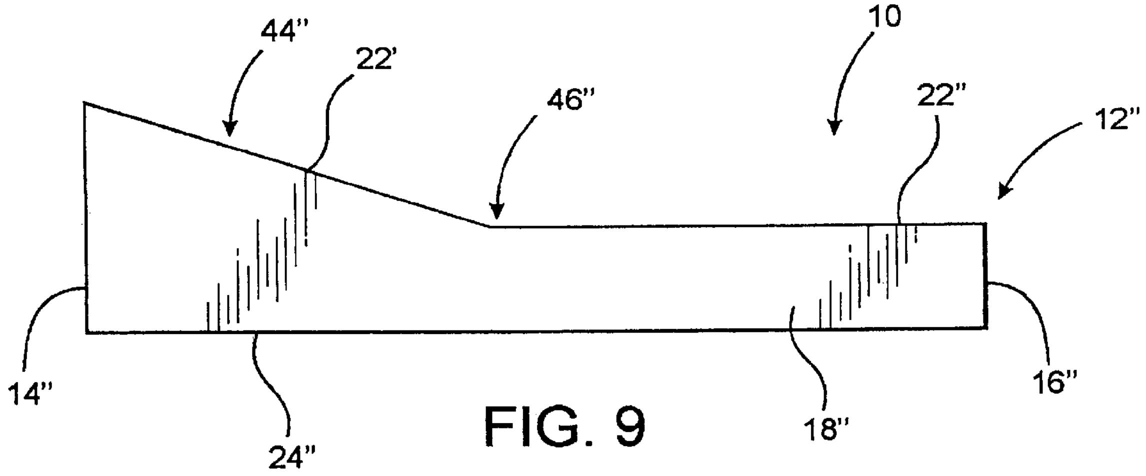
FIG. 9 is a side view of yet another embodiment of the support platform of the mattress assembly of the present invention.

Yet another embodiment of the present invention is shown in FIG. 9, wherein the support platform 12" includes an inclined portion 44" having a more exaggerated incline than that which has been described with reference to FIGS. 1 and 3. More in particular, the proximal end 14" of the support platform 12" is preferably about ten inches (10") to twelve inches (12") in height, as opposed to about half that height in the embodiment described previously. Also, the length of the inclined portion 44", which extends continuously along the outer wall 22' from substantially the proximal end 14" of the support platform 12" to the predetermined location 46" will have a length of about thirty-seven (37") inches, with the remaining length 22" of the platform 12" from location 46" to distal end 16" being substantially horizontal or level for approximately forty-three (43") inches. In addition, the embodiment of FIG. 9 may lack altogether the opening 26 and open area of access 30 described with respect to previous embodiments, such that some patients may more readily use it for recovery from other surgical procedures, such as open heart surgery, wherein it is strongly desired that the patient's chest and/or upper body be maintained in a generally inclined attitude.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A mattress assembly designed to support a patient during a period of recovery from surgery, said assembly comprising:

a) a support platform having an elongated configuration and terminating at spaced apart proximal and distal ends, b) an opening formed in said platform in substantially aligned and receiving relation to a predetermined portion of the patient's body, c) said opening dimensioned and configured to maintain at least the predetermined body portion out of supported engagement with a remainder of said support platform, d) said opening extending completely through said support platform in contiguous relation with opposite sides thereof, e) an access channel formed in said support platform and extending continuously from one side of said support platform inwardly into communicating relation with said opening, f) an insert removably disposable within said access channel exteriorly of said opening, said insert selectively disposable in either a supportive or a non-supportive position, g) an attachment assembly comprising a plurality of attachment members removably connecting said insert within said access channel, and h) said plurality of attachment members disposed on exterior surface portions of said insert and on correspondingly disposed interior surface portions of said access channel.

2. A mattress assembly as recited in claim 1 further comprising a connecting member mounted on exterior portions of said support platform and said insert, said connecting member structured to pivotally dispose said insert between said supportive and non-supported positions.

3. An assembly as recited in claim 1 wherein said access channel extends continuously from one side of said support platform inwardly into interruptive relation with a periphery of said opening.

4. An assembly as recited in claim 3 wherein said access channel includes a sufficiently large transverse dimension to allow passage of medical instrumentation therethrough into and out of said opening.

5. An assembly as recited in claim 1 wherein said supportive position is defined by said insert disposed in closing relation to said access channel and in supporting relation to the patient.

6. An assembly as recited in claim 1 wherein said non-supportive position is defined by at least partial removal of said insert from said access channel.

7. An assembly as recited in claim 6 wherein said insert is removably connected to said support platform and selectively positionable into and out of closing relation to said access channel.

8. An assembly as recited in claim 6 wherein said insert is removably mountable on said support platform and selectively positionable into and out of closing relation to said access channel.

9. An assembly as recited in claim 1 wherein said opening is disposed in substantially equally spaced relation to opposite longitudinal sides of said support platform.

10. An assembly as recited in claim 9 wherein said opening is disposed substantially adjacent and in spaced relation to a mid-point of the length of said support platform and in a closure proximity to said distal end than said proximal end.

11. An assembly as recited in claim 1 wherein said support platform comprises an inclined portion integrally formed with a remainder of said support platform and extending continuously between said proximal end and a predetermined spaced distance from said opening, said inclined portion disposed in supporting relation to a head and at least an upper torso portion of the patient's body.

* * * * *